Patented Mar. 3, 1925.

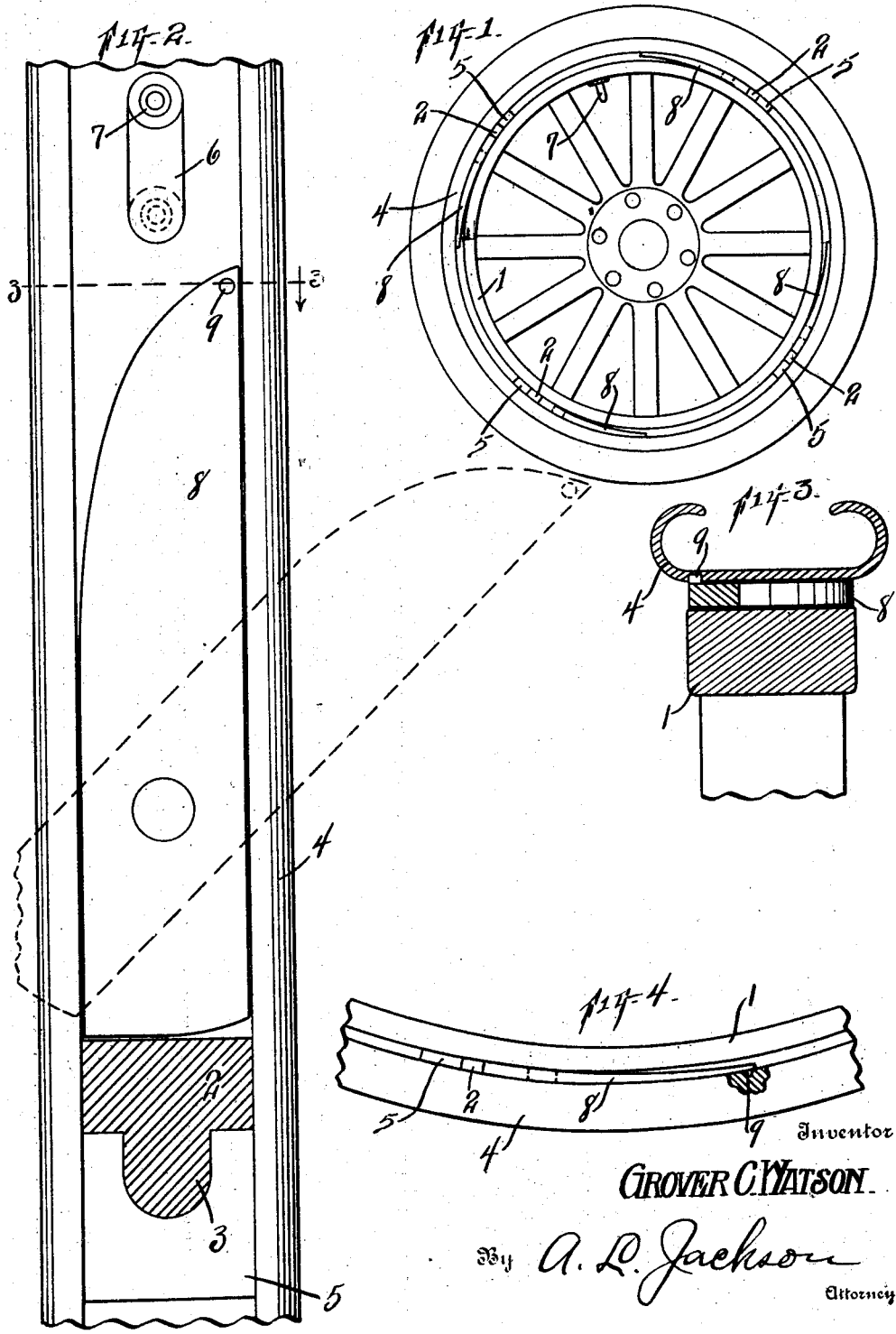

1,528,175

UNITED STATES PATENT OFFICE.

GROVER C. WATSON, OF SABINAL, TEXAS.

TIRE-RIM LOCK FOR DEMOUNTABLE RIMS FOR MOTOR VEHICLES.

Application filed July 24, 1923. Serial No. 653,412.

*To all whom it may concern:*

Be it known that I, GROVER C. WATSON, a citizen of the United States, residing at Sabinal, in the county of Uvalde and State of Texas, have invented certain new and useful Improvements in Tire-Rim Locks for Demountable Rims for Motor Vehicles, of which the following is a specification.

My invention relates to tire rim locks for demountable rims for motor vehicles; and the object is to provide simple devices for locking tire rims on the wheels and which make the mounting and demounting of the rims easily and quickly accomplished and which will securely hold the rims in place. Other objects and advantages will be fully explained in the following description and the invention will be more particularly pointed out in the claim.

Reference is had to the accompanying drawings which form a part of this application.

Fig. 1 is a side elevation of a wheel which is provided with the improvements. Fig. 2 is an enlarged detail view, showing the interior of a portion of a rim and the attachments thereto. Fig. 3 is a section of a wheel and rim. Fig. 4 is a broken enlarged side elevation of the wheel and rim.

Similar characters of reference are used to indicate the same parts throughout the several views.

This invention consists of devices mounted between the wheel and the rim. The wheel 1 is provided with a lug or abutment 2 which is integral therewith and this lug or abutment has a tongue 3. The rim 4 has a lug or abutment 5 which is integral therewith and which has a socket to receive the tongue 3. The rim 4 has a slot 6 so that the rim 4 may be shifted circumferentially on the wheel, the slot 6 being made for the filling valve connection 7. The rim 4 is placed on the wheel 1 and the rim must be placed on the wheel so that the abutment 5 will pass the abutment 2, the dotted outline in Fig. 2 showing the relative position of the rim to the valve connection when the rim is first placed on the wheel. The rim 4 is then shifted circumferentially on the wheel so that the abutment 5 will receive the tongue 3 of the wheel abutment.

After the rim is mounted on the wheel 1, the wheel and rim are locked against circumferential movement on each other. A locking lever 8 is fulcrumed on the rim 4. When the rim is being placed on the wheel, the lever 8 will be turned to an angular position, as shown by dotted outline in Fig. 2. After the rim 4 is mounted with the abutment 5 receiving the tongue 3 as shown in Fig. 2, the lever 8 will be turned to the full line position shown in Fig. 2 with the short end of the lever bearing against the abutment 2 of the wheel. There can be no shifting of the rim and wheel relative to each other while the lever 8 is in the locked position. There may be four sets of the devices 2, 3, 5 and 8, as shown in Fig. 1. The lever 8 is provided with a lug 9 which enters a recess in the rim to prevent displacement of the lever.

What I claim, is,—

A tire rim lock comprising, in combination with a rim and a wheel, an abutment rigid with the wheel and provided with a locking tongue, an abutment rigid with the rim and provided with a socket to receive said tongue, a lever positioned between the wheel and the rim and fulcrumed on said rim and adapted to bear against said wheel abutment, and a lug carried by said lever and projecting in said rim to prevent displacement, said rim having a socket for said lug and said lever being sprung to insert said lug in said socket.

In testimony whereof, I set my hand, this 19th day of July, 1923.

GROVER C. WATSON.